US006414626B1

(12) United States Patent
Greef et al.

(10) Patent No.: US 6,414,626 B1
(45) Date of Patent: Jul. 2, 2002

(54) INTERROGATORS, WIRELESS COMMUNICATION SYSTEMS, METHODS OF OPERATING AN INTERROGATOR, METHODS OF OPERATING A WIRELESS COMMUNICATION SYSTEM, AND METHODS OF DETERMINING RANGE OF A REMOTE COMMUNICATION DEVICE

(75) Inventors: Roy Greef, Boise; David Ovard, Meridian, both of ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/378,430

(22) Filed: Aug. 20, 1999

(51) Int. Cl.$^7$ .......................... G01S 13/06; G01S 13/84
(52) U.S. Cl. .......................... 342/127; 342/42; 342/44; 342/47; 342/51; 342/125; 340/3.1; 340/825.49
(58) Field of Search .......................... 342/42, 44, 51, 342/127, 46, 47, 56, 118, 125, 126, 133, 135, 146, 147; 340/3.1, 825.36, 825.49

(56) References Cited

U.S. PATENT DOCUMENTS

| | | | | |
|---|---|---|---|---|
| 3,659,292 A | * | 4/1972 | Martin et al. | 342/44 |
| 4,075,632 A | | 2/1978 | Baldwin et al. | 342/44 |
| 4,163,233 A | * | 7/1979 | Becker | 342/125 |
| 4,278,977 A | * | 7/1981 | Nossen | 342/42 |
| 4,297,700 A | * | 10/1981 | Nard et al. | 342/125 |
| 4,370,653 A | * | 1/1983 | Crowley | 342/42 |
| 4,757,315 A | * | 7/1988 | Lichtenberg et al. | 342/125 |
| 4,804,961 A | * | 2/1989 | Hane | 342/125 |
| 4,851,851 A | * | 7/1989 | Hane | 342/112 |
| 4,926,182 A | | 5/1990 | Ohta et al. | 342/44 |
| 5,150,310 A | * | 9/1992 | Greenspun et al. | 342/451 |
| 5,220,332 A | * | 6/1993 | Beckner et al. | 342/125 |
| 5,594,448 A | * | 1/1997 | d'Hont | 342/44 |
| 5,617,060 A | | 4/1997 | Wilson et al. | 320/129 |
| 5,621,412 A | | 4/1997 | Sharpe et al. | 342/51 |
| 5,649,296 A | | 7/1997 | MacLellan et al. | 455/38.2 |
| 5,805,082 A | * | 9/1998 | Hassett | 340/928 |
| 6,122,329 A | * | 9/2000 | Zai et al. | 375/329 |
| 6,127,917 A | * | 10/2000 | Tuttle | 340/10.1 |
| 6,130,602 A | | 10/2000 | O'Toole et al. | 340/10.33 |

FOREIGN PATENT DOCUMENTS

| | | | | | |
|---|---|---|---|---|---|
| GB | 1462227 A | * | 1/1977 | | G01S/9/56 |
| GB | 2215933 A | * | 9/1989 | | G01S/13/74 |
| JP | 07035851 A | * | 2/1995 | | G01S/13/82 |

* cited by examiner

Primary Examiner—John B. Sotomayor
(74) Attorney, Agent, or Firm—Wells St. John, P.S.

(57) ABSTRACT

Interrogators, wireless communication systems, methods of operating an interrogator, methods of operating a wireless communication system and methods of determining range of a remote communication device are provided. According to a first aspect, an interrogator includes communication circuitry configured to output a plurality of wireless signals toward a radio frequency identification device and to receive a plurality of wireless signals from the radio frequency identification device; and a processor coupled with the communication circuitry and configured to determine a range of the radio frequency identification device relative to the interrogator responsive to the received wireless signals. A method of operating an interrogator of another aspect includes outputting a plurality of wireless signals toward a radio frequency identification device; receiving a plurality of wireless signals 1s from the radio frequency identification device; and determining range of the radio frequency identification device relative to the interrogator after the receiving.

52 Claims, 6 Drawing Sheets

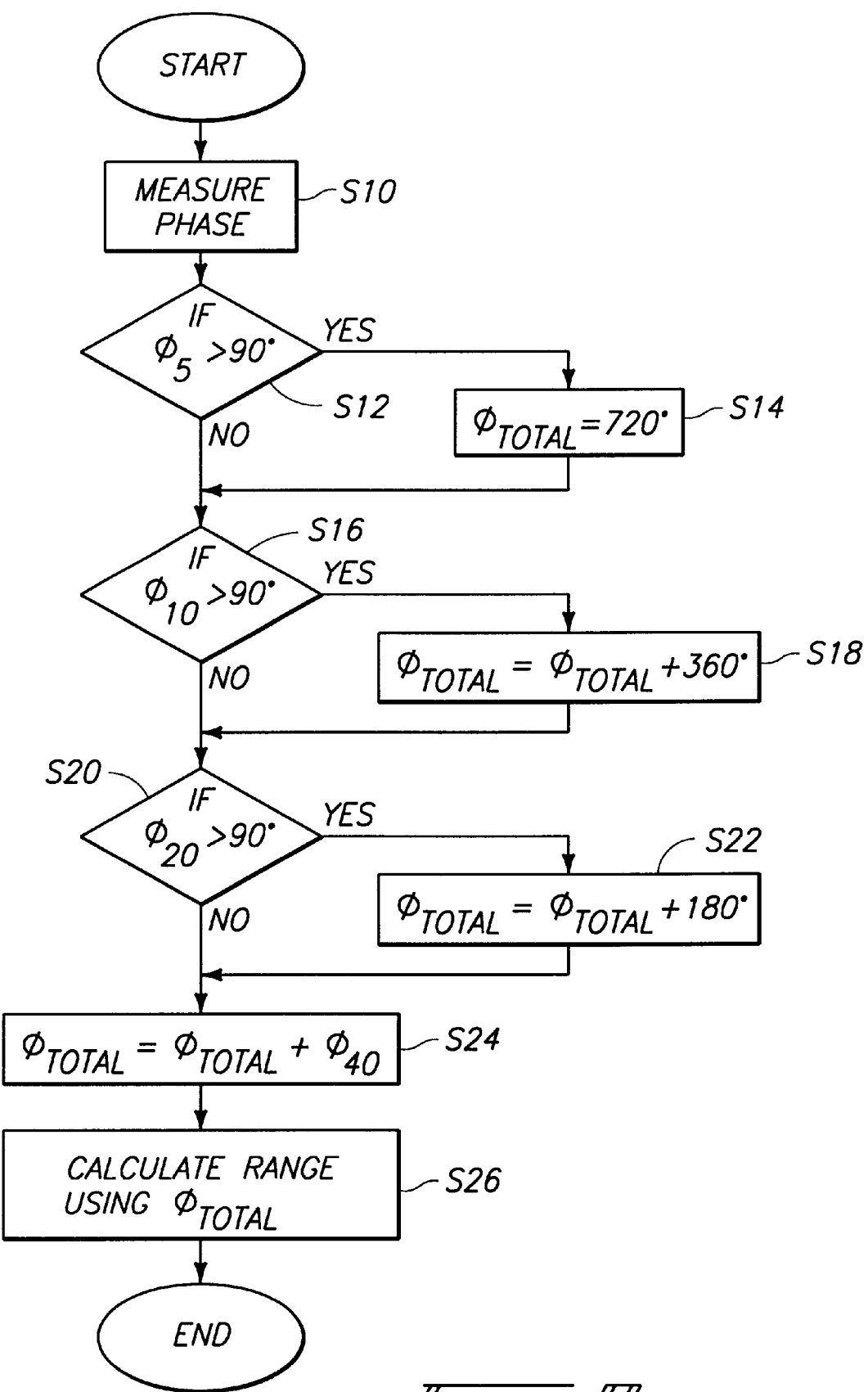

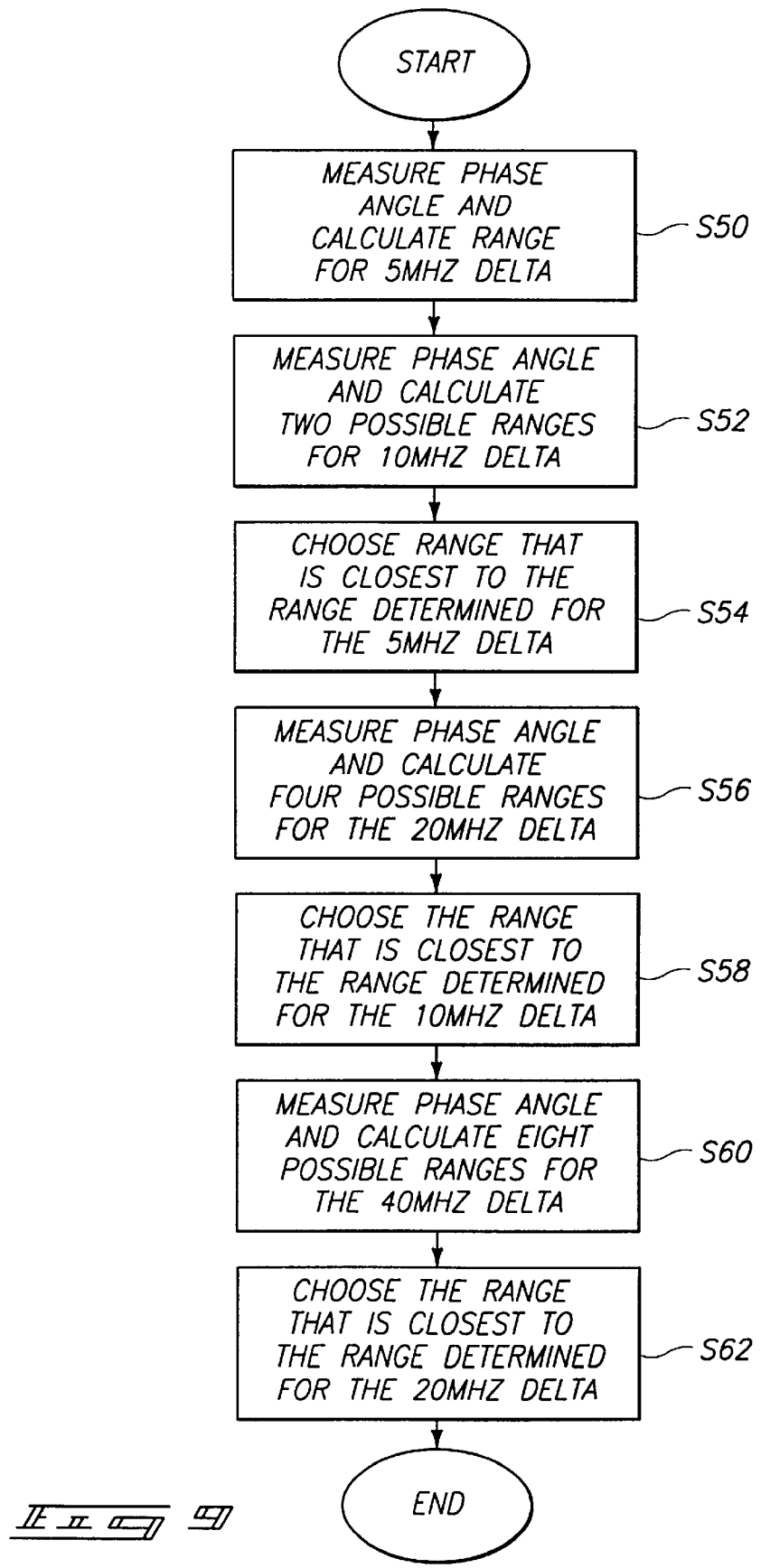

INTERROGATORS, WIRELESS COMMUNICATION SYSTEMS, METHODS OF OPERATING AN INTERROGATOR, METHODS OF OPERATING A WIRELESS COMMUNICATION SYSTEM, AND METHODS OF DETERMINING RANGE OF A REMOTE COMMUNICATION DEVICE

TECHNICAL FIELD

The present invention relates to interrogators, wireless communication systems, methods of operating an interrogator, methods of operating a wireless communication system and methods of determining range of a remote communication device.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, now U.S. Pat. No. 6,130,602, issued Oct. 10, 2000, assigned to the assignee of the present application, and incorporated herein by reference. This application discloses the use of a radio frequency (RF) communication system including communication devices. The disclosed communication devices include an interrogator and a remote transponder, such as a tag or card.

Such communication systems can be used in various applications such as identification applications. The interrogator is configured to output a polling or interrogation signal which may comprise a radio frequency signal including a predefined code. The remote transponders of such a communication system are operable to transmit an identification signal responsive to receiving an appropriate polling or interrogation signal.

More specifically, the appropriate transponders are configured to recognize the predefined code. The transponders receiving the code can subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is initially attached to an object of interest. Responsive to receiving the appropriate polling signal, the identification device is equipped to output an identification signal. Generating the identification signal identifies the presence or location of the identification device and the article or object attached thereto.

Some conventional electronic identification systems utilize backscatter communication techniques. More specifically, the interrogator outputs a polling signal followed by a continuous wave (CW) signal. The remote communication devices are configured to modulate the continuous wave signal in backscatter communication configurations. This modulation typically includes selective reflection of the continuous wave signal. The reflected continuous wave signal includes the reply message from the remote devices which is demodulated by the interrogator.

SUMMARY OF THE INVENTION

The present invention provides interrogators, wireless communication systems, methods of operating an interrogator, methods of operating a wireless communication system and methods of determining range of a remote communication device.

According to one aspect of the present invention, a wireless communication system including an interrogator and a plurality of remote communication devices is provided. The interrogator includes communication circuitry configured to output a plurality of wireless signals to the remote communication devices. Exemplary remote communication devices include radio frequency identification devices. The communication circuitry of the interrogator is further configured to receive plural wireless signals from the remote communication devices. In the described embodiment, the communication circuitry is configured to output a continuous wave signal and the remote communication devices are individually operable to backscatter modulate the continuous wave signal.

In certain aspects, a processor of the interrogator is configured to determine ranges of the remote communication devices relative to the interrogator. Such ranges may be calculated responsive to the received wireless signals. The processor of the interrogator can determine the phase of individual received wireless signals and can determine the range responsive to the phase determination. Communication circuitry of the interrogator can be configured to adjust the frequency of outputted wireless signals and to provide frequency adjustments of different magnitudes. In some aspects, the communication circuitry provides frequency adjustments of increasing magnitude over time.

Further, the processor of the interrogator of the described embodiment is configured to utilize a range determination from an initially received wireless signal to determine a range from a subsequently received wireless signal in some aspects.

Other structures and methods are provided according to other aspects of the present invention as described below.

BRIEF DESCRIPTION OF THE DRAWINGS

Preferred embodiments of the invention are described below with reference to the following accompanying drawings.

FIG. 8 is a flowchart illustrating one exemplary method for determining a range of a remote communication device.

FIG. 9 is flowchart of another exemplary method for determining the range of a remote communication device.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
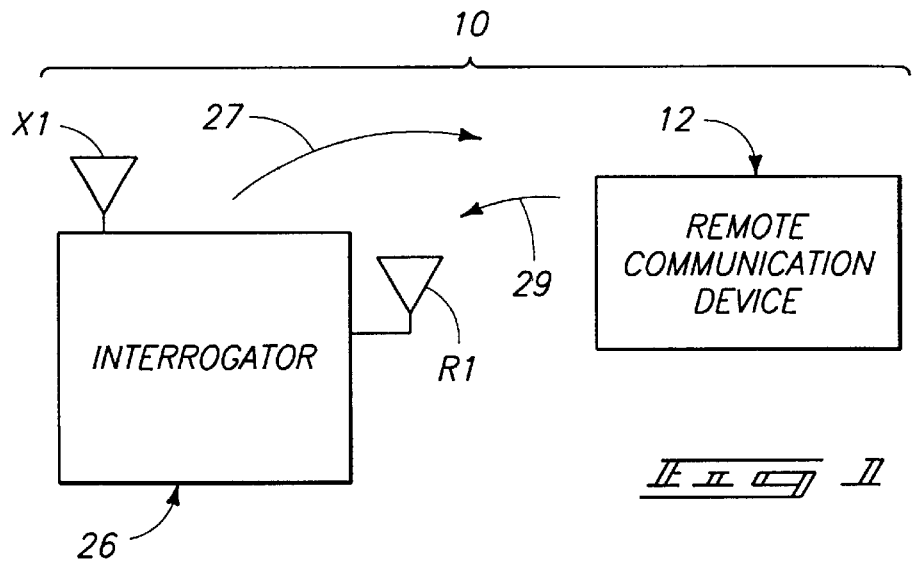
FIG. 1 is a block diagram of an exemplary wireless communication system.

FIG. 1 illustrates a wireless communication system 10 embodying the invention. Communication system 10 is configured as an electronic identification system in the embodiment described herein. Other applications of communication system 10 are possible. Further, the described communication system 10 is configured for backscatter communications as described further below. Other communication protocols are utilized in other embodiments.

The depicted communication system 10 includes at least one electronic wireless remote communication device 12 and an interrogator 26. Radio frequency communications can occur intermediate remote communication device 12 and interrogator 26 for use in identification systems and product monitoring systems as exemplary applications.

Devices 12 include radio frequency identification devices (RFID) or remote intelligent communication (RIC) devices in the exemplary embodiments described herein. Remote intelligent communication devices can perform functions in addition to identification functions. Exemplary devices 12 are disclosed in U.S. patent application Ser. No. 08/705,043, filed Aug. 29, 1996. Plural wireless remote communication devices 12 typically communicate with interrogator 26 although only one such device 12 is illustrated in FIG. 1. Such a remote communication device 12 can be referred to as a tag or card as illustrated and described below.

Although multiple remote communication devices 12 can be employed in communication system 10, there is typically no communication between multiple devices 12. Instead, the multiple communication devices 12 communicate with interrogator 26. Multiple communication devices 12 can be used in the same field of interrogator 26 (i.e., within the communications range of interrogator 26 ). Similarly, multiple interrogators 26 can be in proximity to one or more of remote communication devices 12.

The above described system 10 is advantageous over prior art devices that utilize magnetic field effect systems because, with system 10, a greater range can be achieved, and more information can be communicated (instead of just identification information). As a result, such a system 10 can be used, for example, to monitor large warehouse inventories having many unique products needing individual discrimination to determine the presence of particular items within a large lot of tagged products.

Remote communication device 12 is configured to interface with interrogator 26 using a wireless medium in one embodiment. More specifically, communications intermediate communication device 12 and interrogator 26 occur via an electromagnetic link, such as an RF link (e.g., at microwave frequencies) in the described embodiment. Interrogator 26 is configured to output forward link wireless communications 27. Further, interrogator 26 is operable to receive reply or return link wireless communications 29 from remote communication devices 12 responsive to the outputting of forward communication 27.

In accordance with the above, forward communications 27 and return communications 29 individually comprise wireless signals, such as radio frequency signals, in the described embodiment. Other forms of electromagnetic communication, such as infrared, acoustic, etc. are possible.

Interrogator unit 26 includes a plurality of antennas X1, R1, as well as transmitting and receiving circuitry, similar to that implemented in devices 12. Antenna X1 comprises a transmit antenna and antenna R1 comprises a receive antenna individually connected to interrogator 26.

In operation, interrogator 26 transmits the interrogation command or forward communication signal 27 via antenna X1. Communication device 12 is operable to receive the incoming forward link signal. Upon receiving signal 27, communication device 12 is operable to respond by communicating the responsive reply or return communication signal 29.

In one embodiment, responsive signal 29 is encoded with information that uniquely identifies, or labels the particular device 12 that is transmitting, so as to identify any object, animal, automobile, person, etc. with which remote communication device 12 is associated.

More specifically, remote communication device 12 is configured to output an identification signal within return wireless communication 29 responsive to receiving forward wireless communication 27. Interrogator 26 is configured to receive and recognize the identification signal within the return wireless communication 29. The identification signal can be utilized to identify the particular transmitting communication device 12.

Figure 2:
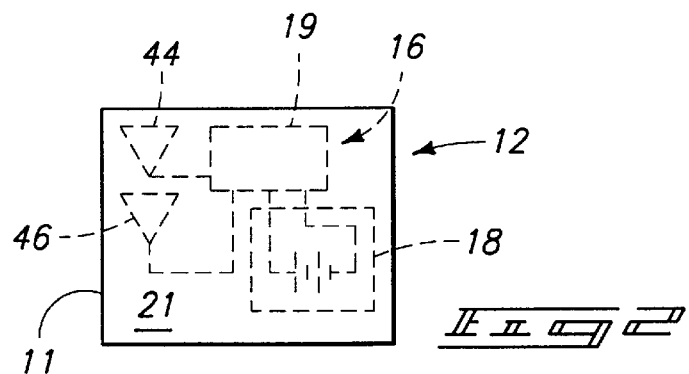
FIG. 2 is a front view of an exemplary remote communication device of the wireless communication system.

Referring to FIG. 2, one embodiment of remote communication device 12 is illustrated. The depicted remote communication device 12 includes communication circuitry 16 having a receiver and a transmitter. Communication circuitry 16 may be implemented as transponder circuitry in one configuration. Exemplary communication circuitry 16 includes a small outline integrated circuit (SOIC) 19 available as radio frequency identification device (RFID) circuitry from Micron Communications Inc., 3176 South Denver Way, Boise, Id. 83705 under the trademark MicroStamp™ Engine and having designations MSEM256X10SG, MT59RC256R1FG5.

Communication circuitry 16 is configured to receive and process communication signals. Exemplary processing includes analyzing the received communication signal for identification information and processing commands within the communication signal. More or less processing can be performed by communication circuitry 16. Thereafter, communication circuitry 16 selectively generates communication signals for communication to interrogator 26. Remote communication device 12 further includes a power source 18 connected to communication circuitry 16 to supply operational power to communication circuitry 16 including integrated circuit 19.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size, and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communication device 12 further includes at least one antenna connected to communication circuitry 16 and configured for at least one of wireless transmission and reception. In the illustrated embodiment, communication device 12 includes at least one receive antenna 44 connected to communication circuitry 16 for radio frequency reception by communication circuitry 16, and at least one transmit antenna 46 connected to communication circuitry 16 for radio frequency transmission by communication circuitry 16.

Receive antenna 44 is configured to receive forward wireless signals 27 and apply communication signals corresponding to the received wireless signals to communication circuitry 16. Transmit antenna 46 is configured to receive generated communication signals from communication circuitry 16 and output return wireless signals 29 corresponding to the generated communication signals. The described antennas are implemented as printed microstrip antennas in one configuration. Further, receive antenna 44 comprises a loop antenna and the transmit antenna 46 comprises a dipole antenna in the described configuration. Transmit antenna 46 has plural dipole halves 47, 48 in the configuration illustrated in FIG. 4.

Communication device 12 can be included in any appropriate housing or packaging. FIG. 2 shows but one example of a housing in the form of a miniature housing 11 encasing device 12 to define a tag which can be supported by an object (e.g., hung from an object, affixed to an object, etc.).

Figure 3:
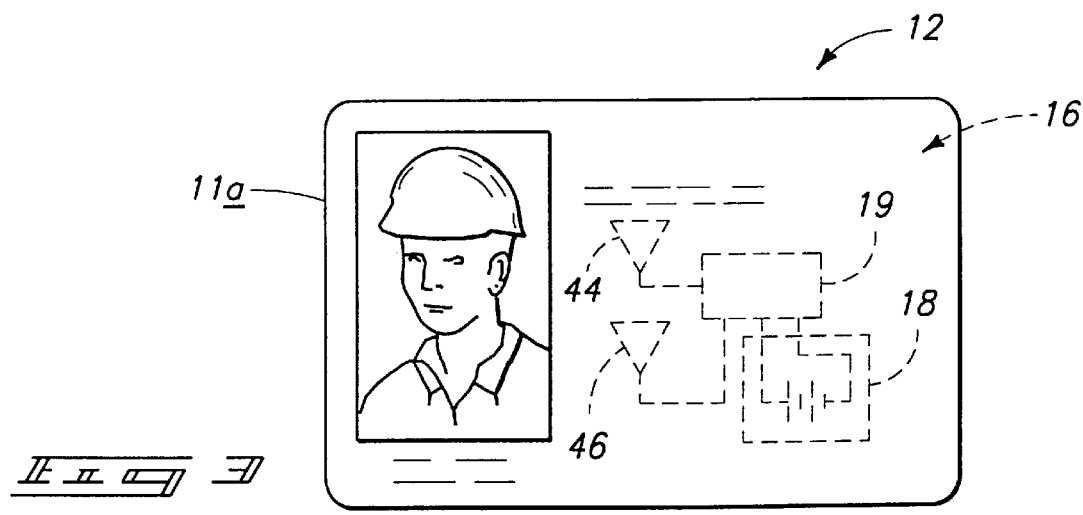
FIG. 3 is a front view of another remote communication device configuration.

Referring to FIG. 3, an alternative configuration of housing 11a of remote communication device 12 is illustrated. FIG. 3 shows remote communication device 12 having housing 11a in the form of a card. Card housing 11a preferably comprises plastic or other suitable material. Remote communication device 12 may be utilized as an employee identification badge including the communication circuitry 16. In one embodiment, the front face of housing 11a has visual identification features such as an employee photograph or a fingerprint in addition to identifying text.

Although two particular types of housings have been disclosed, the communication device 12 can be included in any appropriate housing. Communication device 12 is preferably of a small size that lends itself to applications employing small housings, such as cards, miniature tags, etc. Larger housings can also be employed. The communication device 12, provided in any appropriate housing, can be supported from or attached to an object in any desired manner.

Figure 4:
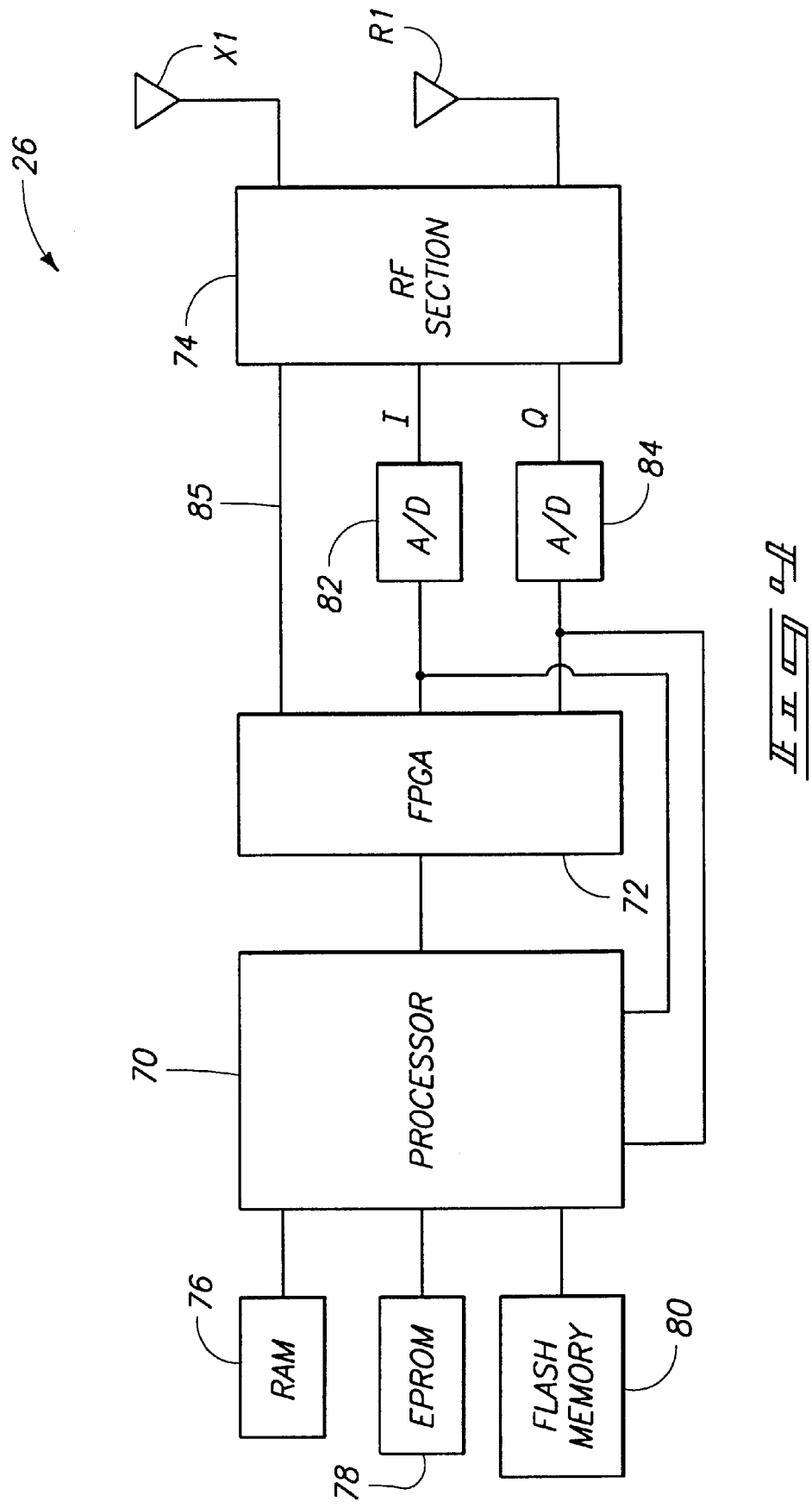
FIG. 4 is a high level schematic diagram of hardware components of an exemplary interrogator of the communication system.

Referring to FIG. 4, one embodiment of interrogator 26 is illustrated. The depicted interrogator 26 includes a processor 70, a field programmable gate array (FPGA) 72, and an RF section 74. In the depicted embodiment, processor 70 comprises a MC68340 microcontroller available from Motorola, Inc. FPGA 72 comprises an XC4028 device available from Xilinx, Inc. Further details of components 70, 72, 74 are described below.

RAM 76, EPROM 78 and flash memory 80 are coupled with processor 70 in the depicted embodiment. Processor 70 is configured to access an applications program for controlling the interrogator 26 and interpreting responses from devices 12. Processor 70 is configured to control communication operations with remote communication devices 12 during normal modes of operation. The applications program can also include a library of radio frequency identification device applications or functions. These functions effect radio frequency communications between interrogator 26 and communication device 12.

RF section 74 is configured to implement wireless (e.g., radio frequency) communications with remote communication devices 12. DPSK modulation techniques can be utilized for communications intermediate devices 12 and interrogator 26. RF section 74 can include downconversion circuitry as described below for generating in-phase (I) and quadrature (Q) signals which contain the DPSK modulated subcarrier for application to FPGA 72 during return link communications.

Plural antennas, including a transmit antenna X1 and a receive antenna R1, are coupled with RF section 74 to provide wireless RF communications. Plural RF transmit (TX) ports and RF receive (RX) ports (not shown) are coupled with RF section 74 in a preferred embodiment. Provision of plural TX ports and RX ports enables interrogator 26 to minimize the effects of multipath when communicating with plural remote communication devices 12.

Analog to digital converters 82, 84 provide received analog RF signals into a digital format for application to FPGA 72. In particular, analog to digital converters 82, 84 are implemented intermediate FPGA 72 and RF section 74 for both in-phase (I) and quadrature (Q) communication lines. An additional connection 85 is provided intermediate FPGA 72 and RF section 74. Digital signals outputted from FPGA 72 via connection 85 are converted to RF signals by RF section 74. Connection 85 can be utilized to transmit phase lock loop (PLL) information, antenna diversity selection information and other necessary communication information. During forward link communications, FPGA 72 is configured to format communication packets received from processor 70 into a proper format for application to RF section 74 for communication.

FPGA 72 is configured to demodulate return link communications received from remote communication devices 12 via RF section 74. FPGA 72 is configured in the described embodiment to perform I and Q combination operations during receive operations. The described FPGA 74 further includes delay and multiplication circuitry to remove the subcarrier. FPGA 74 can also include bit synchronization circuitry and lock detection circuitry. Data, clock and lock detection signals generated within FPGA 74 are applied to processor 70 for processing in the described embodiment.

Processor 70 is configured to control operations of interrogator 26 including outputting of forward link communications and receiving reply link communications. EPROM 78 is configured to store original code and settings selected for the particular application of communication system 10. Flash memory 80 is configured to receive software code updates which may be forwarded to interrogator 26.

RAM device 76 is configured to store data during operations of communication system 10. Such data can include information regarding communications with associated remote communication devices 12 and status information of interrogator 26 during normal modes of operation.

Figure 5:
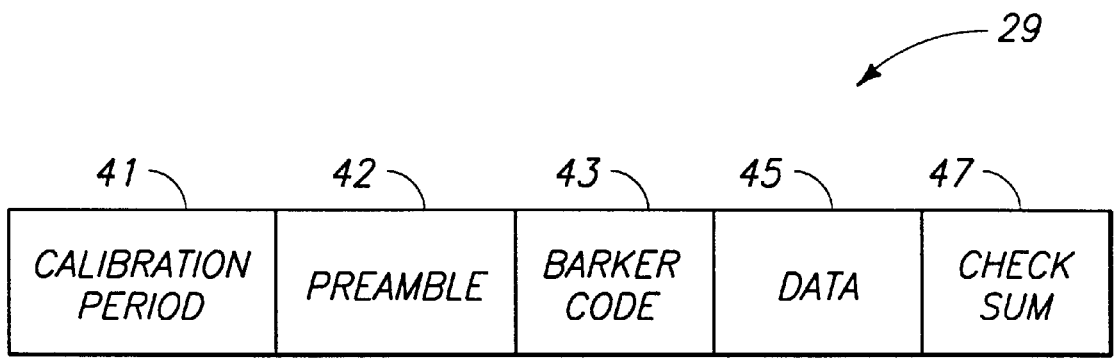
FIG. 5 is an illustrated representation of a return wireless signal from the remote communication device.

Referring to FIG. 5, an exemplary return wireless signal 29 is illustrated for implementing communications from remote communication device 12 to interrogator 26. The depicted return wireless signal 29 includes a plurality of fields. As indicated, the return wireless signal 29 includes a calibration period 41, preamble 42, Barker code 43, data 45 and check sum 47. Remote communication device 12 of FIG. 1 is configured to backscatter modulate a continuous wave signal from interrogator 26 to communicate return wireless signal 29 and the indicated fields in the described embodiment.

Figure 6:
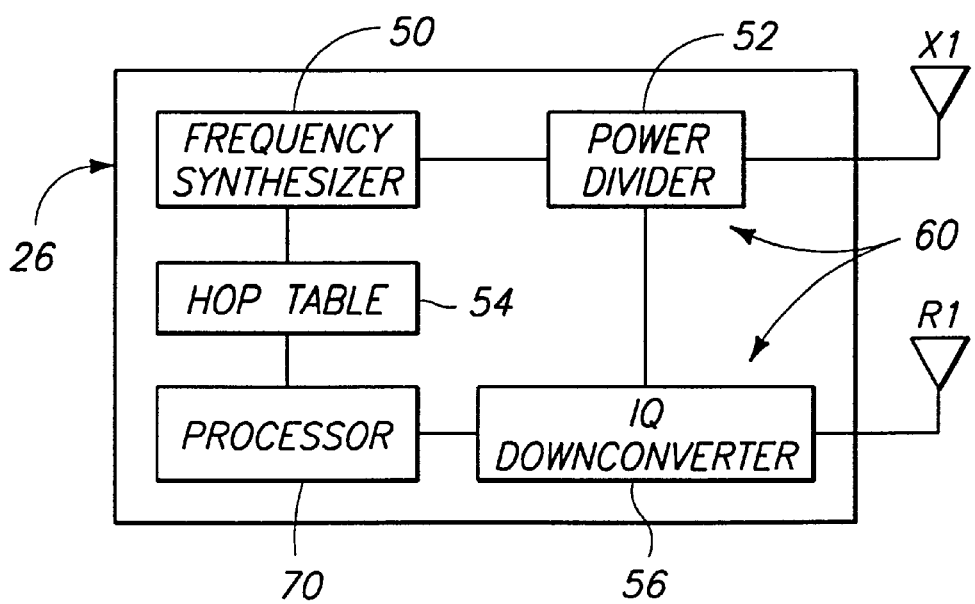
FIG. 6 is a functional block diagram illustrating components of an interrogator.

Referring to FIG. 6, interrogator 26 includes a frequency synthesizer 50, power divider 52, hop table 54, IQ downconverter 56 and processor 70. Components 50, 52, 54, 56 provide communication circuitry 60 of interrogator 26 in the described configuration. Other configurations of communication circuitry 60 are possible.

Frequency synthesizer 50 and power divider 52 may be implemented within RF Section 74 of FIG. 4. Hop table 54 can be provided within FPGA 72 of interrogator 26. Further, IQ downconverter 56 may be implemented within RF Section 74 to apply I and Q signals to analog to digital converters 82, 84, respectively as shown in FIG. 4.

As illustrated in FIG. 6, power divider 52 is coupled with transmit antenna X1 and IQ downconverter 56 is coupled with receive antenna R1. Power divider 52 applies the forward signals to IQ downconverter 56 as well as transmit antenna X1. Application of the forward signals to be communicated using transmit antenna X1 to IQ downconverter 56 via power divider 52 provides a coherent interrogator configuration.

As described in further detail below, processor 70 is configured to determine a range or distance of remote communication device 12 relative to interrogator 26 responsive to received wireless signals 29. More specifically, processor 70 is configured to deter mine the phase of individual received wireless signals and to determine the range responsive to such phase determinations. The received wireless signals are communicated at a respective one of a plurality of different frequencies. In the described configuration, communication circuitry 60 is configured to adjust the frequency of the forward wireless signals to provide return wireless signals of different frequencies as described below.

Processor 70 operates to perform respective phase calculations of the received wireless signals having different frequencies in accordance with the described embodiment. While performing phase calculation operations, processor 70 utilizes output signals of IQ downconverter 56. In the described embodiment, such output signals comprise two IF signals that are in quadrature to one another (i.e., phase of I is 90 degrees from the phase of Q). The described IQ downconverter 56 downconverts a received return wireless signal to a 600 kHz subcarrier IF in the described embodiment. Processor 70 can calculate the phase of the received return wireless signal by taking the ARC tangent of the ratio of the amplitudes of the I and Q signals.

The described configuration of wireless communication system 10 operates at 2.44 GHz. Such may be referred to as a base communication frequency. The described configuration of interrogator 26 slightly varies the base frequency of an outputted forward wireless signal to enable range calculations of remote communication device 12. More specifically, a range of remote communication device 12 relative to interrogator 26 may be determined according to the following equation:

$$Range = \frac{\phi_1 - \phi_2}{360° \left(\frac{f_1}{c} - \frac{f_2}{c}\right)2}$$

wherein $f_1$ equals a first communication frequency, $f_2$ equals a second communication frequency, c equals the speed of light, $\phi_1$ equals a first calculated phase at the first communication frequency and $\phi_2$ equals a second calculated phase at the second communication frequency.

Frequency synthesizer 50 implements the communication frequencies of wireless communication system 10. Hop table 54 operates to control frequency synthesizer 50 to control the exact communication frequency at a given time during operations. Hop table 54 can comprise a list of predefined values to control the adjustment of communication frequencies of frequency synthesizer 50 "on the fly" during communications intermediate interrogator 26 and remote communication device 12. Frequency adjustments occur during periods of communications wherein data is not communicated (e.g., during preamble 42) in the described configuration.

Processor 70 can access such control values from hop table 54. Accordingly, processor 70 has information of the communication frequency of wireless communication system 10 during communications. In the described embodiment, processor 70 is configured to determine the range of remote communication device 12 using the frequency information from hop table 54 and the internally calculated phases of return wireless signals 29. More specifically, using such frequency and phase information in the described configuration, processor 70 determines a range of remote communication device 12 relative to interrogator 26 as described further below.

A change in frequency (e.g., frequency hop) between a first communication frequency and a second communication frequency is selected to avoid ambiguous results and provide increased accuracy. For example, if the magnitude of a frequency hop from the first communication frequency to the second communication frequency is too large, a rollover problem may be experienced. Such is inherent when determining phase calculations inasmuch as the phase rolls over every 360 degrees. Accordingly, an infinite number of ranges can correspond to a given phase.

Using the above equation, a maximum hop between adjacent communication frequencies is determined to avoid the rollover problem. More specifically, a maximum communication range of wireless communication system 10 may be inserted in the above equation along with 360 degrees as a maximum calculated phase (or 180 degrees or other values depending upon the range of phase calculations of the particular phase calculator being utilized). Solving the equation provides a maximum allowed frequency hop to avoid the ambiguous rollover problem.

Conversely, there exists a desire to provide the largest hop possible intermediate the first and second communication frequencies to provide increased accuracy of the range determination of remote communication device 12. In one configuration, numerous return signals having different frequencies may be analyzed using the above equation. Thereafter, the results may be averaged to provide a result of increased accuracy. Other methodologies are possible, some of which are described further below.

Figure 7:
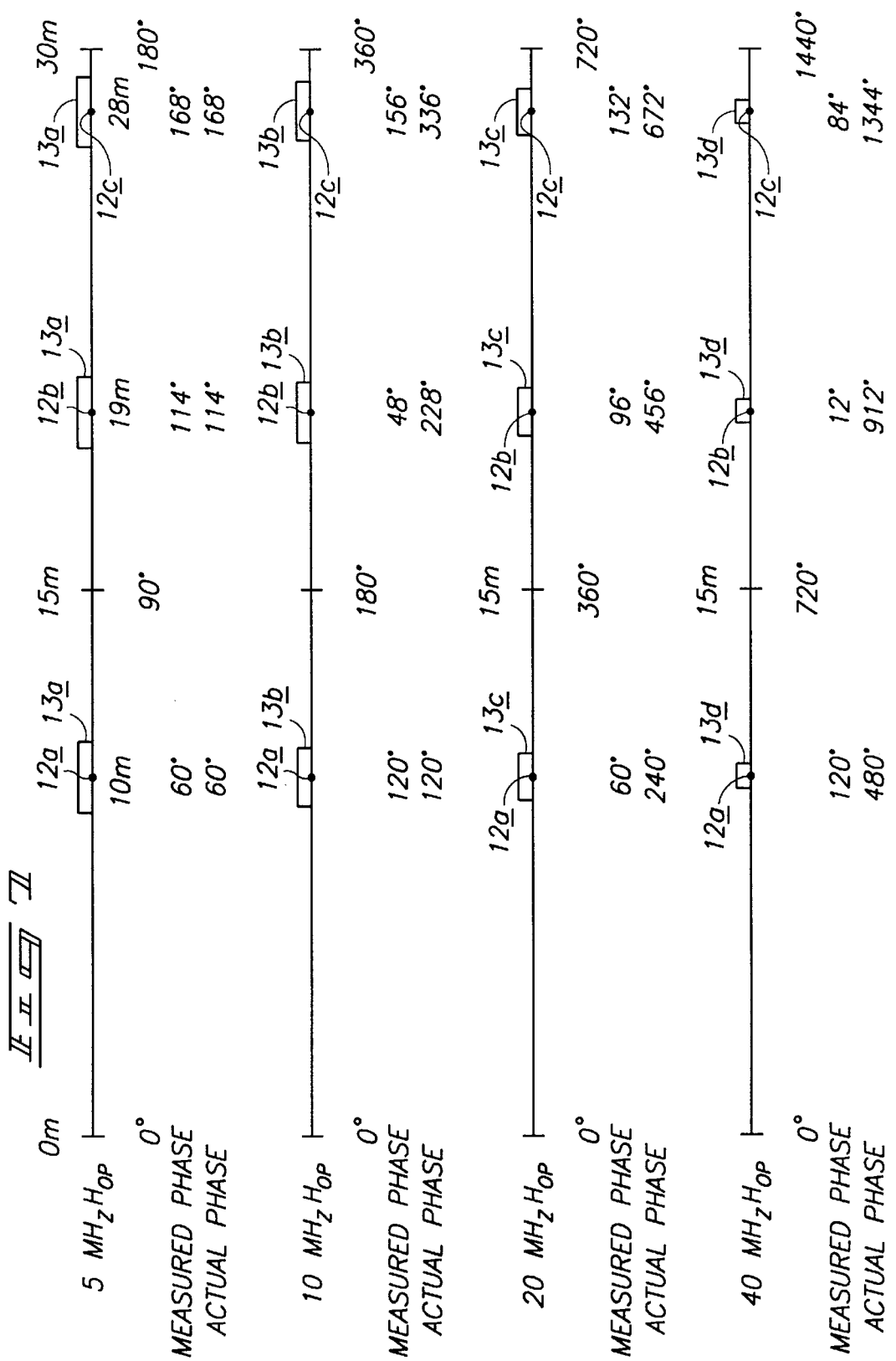
FIG. 7 is a graph illustrating ranges and corresponding phases of a plurality of remote communication devices.

Referring to FIG. 7, a graph illustrates the utilization of a varying hop magnitudes intermediate the communication frequencies. Such illustrates the above-described rollover problem as well as the relationship of accuracy to the frequency hop magnitude.

The illustrated graph corresponds to a wireless communication system 10 having a maximum range of 30 meters and a maximum phase angle that can be measured of 180 degrees (e.g., due to hardware limitations of the phase calculator). A maximum measurement error is plus or minus 6 degrees in the illustrated graph.

Phase values for a plurality of remote communication devices 12a, 12b, 12c are shown. Although not shown in FIG. 7, an interrogator would be positioned at the left of the graph. As depicted, a first remote communication device 12a is positioned at 10 meters from an interrogator, a second remote communication device 12b is positioned at 19 meters from the interrogator, and a third remote communication device 12c is positioned at 28 meters from the interrogator. Graphs corresponding to frequency hops of 5 MHz, 10 MHz, 20 MHz and 40 MHz with respect to a base frequency (e.g., 2.44 GHz) are shown for the remote communication devices 12a, 12b, 12c.

Error is represented by regions 13a, 13b, 13c, 13d illustrated about the individual remote communication devices 12a, 12b, 12c and corresponding to varying magnitudes of frequency hops. More specifically, error regions 13a, 13b, 13c, 13d correspond to respective frequency hops of 5 MHz, 10 MHz, 20 MHz and 40 MHz. As illustrated in the graph, error decreases as the frequency hop magnitude increases as represented by error regions 13a, 13b, 13c, 13d. However, for wireless communication system 10 with a range of 30 meters, frequency hops in excess of 5 MHz are subject to the aforementioned rollover problem wherein a measured phase angle can correspond to more than one range as shown. The measured phase angles correspond to the actual phase for the 5 MHz hop. The rollover problem is experienced for the 10 MHz hop, 20 MHz hop and 40 MHz hop wherein one measured phase corresponds to more than one associated range.

Frequency hops are implemented during communication of a continuous wave from interrogator 26 in the described embodiment. More specifically, frequency hops occur during preamble 42 of return wireless signal 29. It is ideal to provide as many hops as possible during the preamble 42 to provide range measurements of increased accuracy. Such can be averaged as described above or utilized in range determining methodologies described below. Hopping during communication of the preamble field 42 of the continuous wave for a return link communications reduces any impact thereby upon communications of wireless communications system 10 inasmuch as backscatter modulation is utilized in the described embodiment (i.e., remote communication device 12 reflects the outputted continuous wave energy from interrogator 12 ).

Referring to FIG. 8, one possible methodology implemented by processor 70 is described for improving the accuracy of range measurements of remote communication device 12 relative to interrogator 26. More specifically, utilization of the depicted flowchart enables utilization of frequencies of increased magnitude while avoiding the rollover problem. Accordingly, results of increased accuracy are provided. Computer executable program code usable by processor 70 configured to implement the depicted method is stored in EPROM 78. Alternatively, the described methodology may be implemented in hardware.

Initially, processor 70 calculates or measures phase of received return wireless signals 29 at step S10. In the described flowchart, frequency synthesizer 50 communicates with the base frequency of 2.44 GHz and thereafter implements four respective frequency hops individually from the base frequency of 5 MHz, 10, MHz, 20 MHz, 40 MHz according to values of hop table 54. Other hop magnitudes from the base frequency are possible. Processor 70 also has access to the values of hop table 54 and accordingly can correlate received calculated or measured phase values with respective communication frequencies.

Processor 70 calculates or measures a phase angle for the base frequency at step S10. Thereafter, frequency synthesizer 50 provides frequency hops of the continuous wave signal according to hop table 54 and processor 70 determines the corresponding phase. Measured phase for a 5 MHz hop, a 10 MHz hop, a 20 MHz hop and a 40 MHz hop are represented by $\phi_5$, $\phi_{10}$, $\phi_{20}$, $\phi_{40}$, respectively. An end result calculated phase $\phi_{TOTAL}$ is utilized to determine the range of remote communication device 12 following the execution of the depicted flowchart. Initially, $\phi_{TOTAL}$ is set to zero at step S10.

At step S12, processor 70 determines whether the measured $\phi_5$ corresponding to the 5 MHz hop from the base frequency is greater than 90 degrees. If so, processor 70 proceeds to step S14 and sets $\phi_{TOTAL}$ equal to 720 degrees. Following step S14 or if the result of step S12 is no, processor 70 proceeds to step S16 and determines whether the measured $\phi_{10}$ corresponding to the 10 MHz hop is greater than 90 degrees. If so, processor 70 proceeds to step S18 and sets $\phi_{TOTAL}$ equal to the previous $\phi_{TOTAL}$ value plus 360 degrees. Thereafter, or if the result of step S16 is no, processor 70 proceeds to step S20 and determines whether $\phi_{20}$ corresponding to the 20 MHz hop is greater than 90 degrees. If so, processor 70 proceeds to step S22 and sets $\phi_{TOTAL}$ equal to the previous $\phi_{TOTAL}$ value plus 180 degrees. Thereafter, or responsive to the result of step S20 being no, processor 70 proceeds to step S24 and sets $\phi_{TOTAL}$ equal to $\phi_{TOTAL}$ plus $\phi_{40}$ corresponding to the measured phase of the 40 MHz hop. At step S26, processor 70 can then calculate the range of remote communication device 12 using the measured phase for the base frequency and $\phi_{TOTAL}$ corresponding to the 40 MHz hop within the above-described equation.

Referring to FIG. 9, another method of determining range of remote communication device 12 is described. The illustrated method provides increased accuracy and avoids the rollover problem associated with phase calculations. Processor 70 may be configured to execute a set of computer program instructions to implement the illustrated range determination method. Alternatively, the depicted method may be implemented in hardware circuitry in other configurations.

Referring to step S50, processor 70 initially measures a phase angle for the base frequency. Then, frequency synthesizer 50 hops 5 MHz, and processor 70 measures a phase for the new frequency. Processor 70 also calculates a range for a 5 MHz delta frequency hop at step S50. Thereafter, frequency synthesizer 50 hops 10 MHz and processor 70 measures the new phase angle and calculates two possible ranges (i.e., due to the rollover problem) using the measured phase for the base frequency and a measured phase following the 10 MHz delta frequency hop at step S52. For remote communication device 12a of FIG. 7, such values are 10 meters and 25 meters corresponding to a measured phase of 120 degrees.

At step S54, processor 70 chooses the appropriate one of the two ranges that is closest to the range determined for the 5 MHz delta frequency hop of step S50. Referring again to the graph of FIG. 7, a range of 10 meters as opposed to 25 meters degrees will be utilized for remote communication device 12a using the range determination from the 5 MHz hop.

Thereafter, at step S56, processor 70 measures the phase angle and calculates four possible ranges of remote communication device 12a for a 20 MHz delta frequency hop. Such four ranges would be 2.5 meters, 10 meters, 17.5 meters and 24 meters. At step S58, processor 70 chooses a corresponding range that is closest to the range determined for the 10 MHz delta frequency hop (i.e., 10 meters).

At step S60, processor 70 measures the phase angle and calculates eight possible ranges for a 40 MHz delta frequency hop. Such calculated ranges would be 2.5 meters, 6.25 meters, 10 meters, 13.75 meters, 17.5 meters, 21.25 meters, 25 meters and 28.75 meters. At step S62, processor 70 chooses a corresponding range that is closest to the range determined for the 20 MHz delta (i.e., 10 meters).

Accordingly, communication circuitry 60 of interrogator 26 provides frequency adjustments of different magnitudes in at least some range-finding operations. In the above-described operations, communications circuitry 60 provides frequency adjustments of increased magnitudes over time.

In actual implementations the readings will not necessarily always match exactly (e.g., all range calculations equaling 10 meters exactly) due to multipath, phase calculation accuracy, etc. However, it is believed that the information of a previous range determination may be utilized in a subsequent range determination to defeat or minimize the rollover problem when hops of increased magnitude are utilized.

More specifically, processor 70 may utilize a range determination from an initial received wireless signal to determine the range for a subsequent received wireless signal. As indicated above, such hops of increased magnitude improve the accuracy of the range determination. Further, the above hop magnitudes are exemplary. Other hop magnitudes may be utilized depending upon hardware, the accuracy of phase calculations by processor 70, the range of wireless communication system 10, etc.

Processor 70 can be further configured for additional calculations or monitoring applications of associated remote communication devices as described in a copending U.S. patent application entitled "Interrogators, Wireless Communication Systems, Methods of Operating an Interrogator, Methods of Monitoring Movement of a Radio Frequency Identification Device, Methods of Monitoring Movement of a Remote Communication Device and Movement Monitoring Methods", filed the same day as the present application, now U.S. patent application Ser. No. 09/378,432, filed Aug. 20, 1999 having the same inventors as the inventors hereof, and incorporated herein by reference.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An interrogator comprising:
   communication circuitry configured to output a plurality of wireless signals toward a radio frequency identification device and to receive a plurality of wireless signals from the radio frequency identification device; and
   a processor coupled with the communication circuitry and configured to determine a range of the radio frequency identification device relative to the interrogator responsive to the received wireless signals.

2. The interrogator according to claim 1 wherein the processor is configured to determine the phase of individual ones of the received wireless signals and to determine the range responsive to the phase determination.

3. The interrogator according to claim 1 wherein the communication circuitry is configured to adjust the frequency of the outputted wireless signals, and to provide frequency adjustments of different magnitudes.

4. The interrogator according to claim 1 wherein the communication circuitry is configured to adjust the frequency of the outputted wireless signals, and to provide frequency adjustments of increasing magnitudes over time.

5. The interrogator according to claim 1 wherein the processor utilizes the range determination from an initial received wireless signal to determine the range from a subsequent received wireless signal.

6. The interrogator according to claim 1 wherein the communication circuitry is configured to output a continuous wave signal comprising the outputted wireless signals and the received wireless signals comprise backscatter modulated wireless signals.

7. An interrogator comprising:
   communication circuitry configured to output a plurality of wireless signals at a plurality of frequencies and to receive a plurality of wireless signals at a plurality of frequencies from a remote communication device; and
   a processor coupled with the communication circuitry and configured to determine a phase of individual ones of the received wireless signals and to determine a range of the remote communication device relative to the interrogator responsive to the phase determination of the received wireless signals.

8. The interrogator according to claim 7 wherein the communication circuitry is configured to adjust the frequency of the outputted wireless signals, and to provide frequency adjustments of different magnitudes.

9. The interrogator according to claim 7 wherein the communication circuitry is configured to adjust the frequency of the outputted wireless signals, and to provide frequency adjustments of increasing magnitudes over time.

10. The interrogator according to claim 7 wherein the processor utilizes the range determination from an initial received wireless signal to determine the range from a subsequent received wireless signal.

11. The interrogator according to claim 7 wherein the communication circuitry is configured to output a continuous wave signal comprising the wireless signals and the received wireless signals comprise backscatter modulated wireless signals.

12. An interrogator comprising:
    communication circuitry configured to output a plurality of wireless signals at a plurality of frequencies and to receive a plurality of wireless signals at a plurality of frequencies from a remote communication device, the communication circuitry being further configured to adjust the frequency of the outputted wireless signals and to provide adjustments of increased frequency magnitude over time; and
    a processor coupled with the communication circuitry and configured to determine a phase of individual ones of the received wireless signals and to determine a range of the remote communication device responsive to the phase determination of the received wireless signals.

13. The interrogator according to claim 12 wherein the processor utilizes the range determination from an initial received wireless signal to determine the range from a subsequent received wireless signal.

14. The interrogator according to claim 12 wherein the communication circuitry is configured to output a continuous wave signal comprising the outputted wireless signals and the received wireless signals comprise backscatter modulated wireless signals.

15. A wireless communication system comprising:
    a remote communication device configured to receive a plurality of forward wireless signals and to output a plurality of return wireless signals responsive to the received forward wireless signals;
    an interrogator configured to output the forward wireless signals toward the remote communication device and receive the return wireless signals from the remote communication device, the interrogator being further configured to determine a range of the remote communication device relative to the interrogator; and
    wherein the interrogator is configured to output the forward wireless signals comprising a continuous wave signal, and the return wireless signals comprise backscatter modulated wireless signals.

16. The system according to claim 15 wherein the interrogator is configured to determine the range of the remote communication device responsive to the return wireless signals received within the interrogator.

17. The system according to claim 15 wherein the interrogator is configured to determine a phase of individual ones of the return wireless signals and to determine the range of the remote communication device responsive to the phase determination.

18. The system according to claim 15 wherein the interrogator is configured to adjust the frequency of the forward wireless signals, and to provide frequency adjustments of different magnitudes.

19. The system according to claim 15 wherein the interrogator is configured to adjust the frequency of the forward wireless signals, and to provide frequency adjustments of increasing magnitudes over time.

20. The system according to claim 15 wherein the interrogator utilizes the range determination from an initial return wireless signal to determine the range from a subsequent return wireless signal.

21. The system according to claim 15 wherein the interrogator comprises a coherent interrogator.

22. A wireless communication system comprising:
a radio frequency identification device configured to receive a plurality of wireless signals at a plurality of frequencies and selectively backscatter modulate the received wireless signals; and
an interrogator configured to output the plurality of wireless signals at the plurality of frequencies and receive the backscatter modulated wireless signals from the radio frequency identification device, the interrogator being further configured to determine the phase of the received backscatter modulated wireless signals and to determine a range of the radio frequency identification device relative to the interrogator responsive to the phase determination.

23. The system according to claim 22 wherein the interrogator is configured to adjust the frequency of the outputted wireless signals, and to provide frequency adjustments of different magnitudes.

24. The system according to claim 22 wherein the interrogator is configured to adjust the frequency of the outputted wireless signals, and to provide frequency adjustments of increasing magnitudes over time.

25. The system according to claim 22 wherein the interrogator utilizes the range determination from an initial received wireless signal to determine the range from a subsequent received wireless signal.

26. A method of operating an interrogator comprising:
outputting a plurality of wireless signals toward a radio frequency identification device;
receiving a plurality of wireless signals from the radio frequency identification device; and
determining distance of the radio frequency identification device relative to the interrogator after the receiving.

27. The method according to claim 26 wherein the outputting includes outputting the wireless signals at a plurality of frequencies and the receiving includes receiving the wireless signals at a plurality of frequencies, and further comprising determining a phase of individual ones of the received wireless signals and the determining distance being responsive to the determining phase.

28. The method according to claim 26 further comprising adjusting the frequency of the outputted wireless signals by a plurality of different frequency magnitudes.

29. The method according to claim 26 further comprising:
adjusting the frequency of the outputted wireless signals by a plurality of frequency magnitudes; and
increasing the frequency magnitudes during the adjusting.

30. The method according to claim 26 wherein the outputting comprises outputting a continuous wave signal at the plurality of frequencies and the receiving comprises receiving backscatter modulated signals.

31. The method according to claim 26 wherein the determining distance comprises utilizing a distance determination corresponding to an initial received wireless signal to determine the distance from a subsequent received wireless signal.

32. A method of operating an interrogator comprising:
outputting a plurality of wireless signals at a plurality of frequencies toward a remote communication device;
receiving a plurality of wireless signals at a plurality of frequencies from the remote communication device;
determining phase for individual ones of the received wireless signals; and
determining range of the remote communication device relative to the interrogator responsive to the determining.

33. The method according to claim 32 further comprising:
adjusting the frequency of the outputted wireless signals by a plurality of different frequency magnitudes.

34. The method according to claim 32 further comprising:
adjusting the frequency of the outputted wireless signals by a plurality of frequency magnitudes; and
increasing the frequency magnitudes during the adjusting.

35. The method according to claim 32 wherein the outputting comprises outputting a continuous wave signal at the plurality of frequencies and the receiving comprises receiving backscatter modulated signals.

36. The method according to claim 32 wherein the determining range comprises utilizing the range determination corresponding to an initial received wireless signal to determine the range from a subsequent received wireless signal.

37. A method of operating a wireless communication system comprising:
first outputting a plurality of forward wireless signals using an interrogator;
first receiving the forward wireless signals from the interrogator using a remote communication device;
second outputting a plurality of return wireless signals using the remote communication device responsive to the receiving;
second receiving the return wireless signals from the remote communication device using the interrogator;
determining the range of the remote communication device relative to the interrogator after the receiving; and
wherein the first outputting comprises outputting a continuous wave signal at the plurality of frequencies and the second receiving comprises receiving backscatter modulated signals.

38. The method according to claim 37 wherein the determining includes determining responsive to the received return wireless signals.

39. The method according to claim 37 wherein the first outputting includes outputting the forward wireless signals at a plurality of frequencies and the second receiving includes receiving the return wireless signals at a plurality of frequencies, and further comprising determining a phase of individual ones of the received forward wireless signals and the determining range being responsive to the determining phase.

40. The method according to claim 37 further comprising:

adjusting the frequency of the outputted forward wireless signals by a plurality of different frequency magnitudes.

41. The method according to claim 37 further comprising:

adjusting the frequency of the outputted forward wireless signals by a plurality of frequency magnitudes; and increasing the frequency magnitudes during the adjusting.

42. The method according to claim 37 wherein the determining range comprises utilizing the range determination corresponding to an initial received return wireless signal to determine the range from a subsequent received return wireless signal.

43. A method of operating a wireless communication system comprising:

outputting a plurality of forward wireless signals using an interrogator;

receiving the forward wireless signals from the interrogator using a radio frequency identification device;

selectively backscatter modulating the forward wireless signals using the radio frequency identification device;

receiving the backscattered wireless signals using the interrogator;

determining the phase of the backscattered wireless signals; and determining the range of the radio frequency identification device relative to the interrogator after the determining phase.

44. The method according to claim 43 further comprising:

adjusting the frequency of the outputted forward wireless signals by a plurality of different frequency magnitudes.

45. The method according to claim 40 further comprising:

adjusting the frequency of the outputted forward wireless signals by a plurality of frequency magnitudes; and increasing the frequency magnitudes during the adjusting.

46. The method according to claim 43 wherein the determining range comprises utilizing the range determination corresponding to an initial received return wireless signal to determine the range from a subsequent received return wireless signal.

47. A method of determining range of a remote communication device comprising:

outputting a plurality of forward wireless signals toward a remote communication device at a plurality of frequencies using an interrogator;

receiving a plurality of return wireless signals from the remote communication device at a plurality of frequencies using the interrogator;

first determining a phase of individual ones of the received return wireless signals; and second determining a range of the remote communication device relative to the interrogator after the first determining, wherein the second determining includes utilizing the range determination corresponding to an initial received return wireless signal to determine the range from a subsequent received return wireless signal.

48. The method according to claim 47 further comprising:

adjusting the frequency of the outputted forward wireless signals by a plurality of different frequency magnitudes.

49. The method according to claim 47 further comprising:

adjusting the frequency of the outputted forward wireless signals by a plurality of frequency magnitudes; and increasing the frequency magnitudes during the adjusting.

50. The method according to claim 47 wherein the outputting comprises outputting a continuous wave signal at the plurality of frequencies and the receiving comprises receiving backscatter modulated signals.

51. A method of operating a wireless communication system comprising:

providing a wireless communication system comprising a coherent interrogator and a radio frequency identification device;

outputting a plurality of wireless signals using the interrogator including:

providing a predefined list of values corresponding to a communication range of the wireless communication system;

outputting a forward link wireless signal;

outputting a continuous wave signal; and varying the frequency of the continuous wave signal during the outputting according to the predefined list of values;

receiving the forward link wireless signal and the continuous wave signal using the radio frequency identification device;

processing the forward link wireless signal;

selectively outputting a plurality of return link wireless signals using the radio frequency identification device after the processing, the return link wireless signals comprising a plurality of frequencies corresponding to the varying and the outputting the return link wireless signals including backscatter modulating the continuous wave wireless signal;

receiving the backscattered return link wireless signals using the interrogator;

first determining a phase of individual ones of the backscattered return line wireless signals; and second determining the range of the radio frequency identification device relative to the interrogator after the first determining.

52. A method of operating a wireless communication system comprising:

first outputting a plurality of forward wireless signals using an interrogator;

first receiving the forward wireless signals from the interrogator using a remote communication device;

second outputting a plurality of return wireless signals using the remote communication device responsive to the receiving;

second receiving the return wireless signals from the remote communication device using the interrogator; and determining the range of the remote communication device relative to the interrogator after the receiving;

wherein the first outputting includes outputting the forward wireless signals at a plurality of frequencies and the second receiving includes receiving the return wireless signals at a plurality of frequencies, and further comprising determining a phase of individual ones of the received forward wireless signals and the determining range being responsive to the determining phase.

* * * * *

UNITED STATES PATENT AND TRADEMARK OFFICE
CERTIFICATE OF CORRECTION

PATENT NO.     : 6,414,626 B1
DATED          : July 2, 2002
INVENTOR(S)    : Greef et al.

It is certified that error appears in the above-identified patent and that said Letters Patent is hereby corrected as shown below:

<u>Title page,</u>
Item [75], Inventors, please delete "Greef" and insert -- Greeff --.
Item [57], ABSTRACT,
Line 15, please delete "Is" after "signals".

<u>Column 4,</u>
Line 30, please insert a -- - -- after "G" and before "5".

<u>Column 7,</u>
Line 13, please delete "deter mine" and insert -- determine --.

<u>Column 15,</u>
Line 34, please delete "40" and insert -- 43 --.

Signed and Sealed this

Eleventh Day of February, 2003

JAMES E. ROGAN
*Director of the United States Patent and Trademark Office*